Patented Nov. 10, 1936

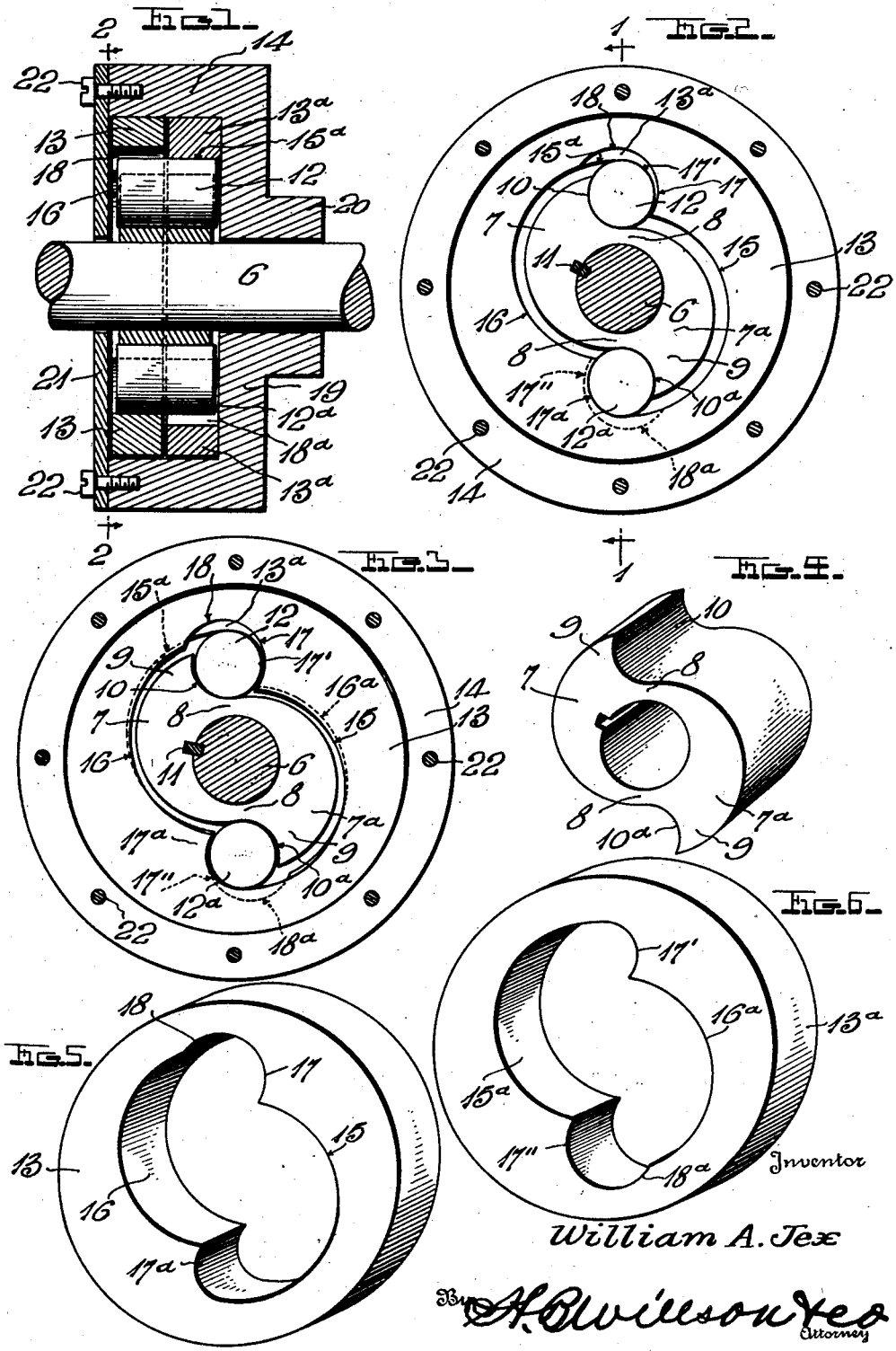

2,060,376

UNITED STATES PATENT OFFICE 2,060,376

ONE-WAY CLUTCH

William A. Jex, Somerville, Mass.

Application December 2, 1935, Serial No. 52,601

3 Claims. (Cl. 192—45)

The invention relates to one-way clutches of the general type including a shaft, a circular wall concentric with said shaft, and clutch means interposed between the wall and shaft for establishing a connection between them upon relative rotation of the parts in one direction, and for freeing said connection and allowing relative rotation in the other direction. The circular wall may be considered as rotatably mounted (as in an oscillatory drive mechanism or a free-wheeling unit), and the shaft may either be considered as a driver for said wall, or as driven by said wall. By fixing the circular wall against rotation, the same structure may be used to allow rotation of the shaft in but one direction, for instance, to prevent an automobile from drifting rearwardly down-hill.

The principal object of the invention is to provide an exceptionally simple and inexpensive, yet an efficient and unusually sensitive one-way clutch which will function without first permitting any great amount of relative rotation of parts, the clutch effect being practically instantaneous when fractional relative rotation occurs in one direction.

With the foregoing in view, the invention resides in the novel subject matter hereinafter described and claimed, description being accomplished by reference to the accompanying drawing.

Fig. 1 is a sectional view on the plane indicated by line I—I of Fig. 2.

Fig. 2 is a sectional view on line 2—2 of Fig. 1 showing the clutch in normal or released position.

Fig. 3 is a view similar to Fig. 2 but showing the clutch engaged.

Fig. 4 is a perspective view of the cams with which the shaft is provided.
Fig. 5 is a perspective view of one of the rings which frictionally engages the circular wall.

Fig. 6 is a perspective view of the other ring which frictionally engages the circular wall.

In the drawing above briefly described, a preferred construction has been illustrated and while this construction will be specifically explained, it is to be understood that within the scope of the invention as claimed, variations may be made.
The shaft 6 is provided with two circumferentially extending peripheral cams 7 and 7ª, each of substantially 180° in length, each of said cams being provided with a radially thin end 8 and with a radially thick end 9, the peripheries of said cams
being arcuate from end to end. The shaft is pro-
vided also with two circumferentially facing shoulders 10 and 10ª, the shoulder 10 being at the juncture of the thin end 8 of one of the cams (7ª) with the thick end 9 of the other of said cams (7) while the shoulder 10ª bears the same relation with the other thin end 8 and thick end 9 of the two cams. The cams are preferably constructed in a single piece and fastened by a key 11 or in any other preferred way to the shaft 6.

Two rollers 12 and 12ª normally engage the shoulders 10 and 10ª respectively and the thin ends of the cams, as seen in Fig. 2, and at least two rings 13 and 13ª encircle said cams and rollers, said rings being within the confines of an annular wall 14 and normally out of any appreciable frictional engagement with said wall. The ring 13 is provided with an internal cam surface 15 which follows the peripheral contour of the cam 7ª, and the ring 13ª is provided with an internal cam surface 15ª which follows the peripheral contour of the cam 7. The ring 13 is preferably formed with an internal surface 16 shaped to correspond with the cam surface 15ª of the ring 13ª, although this is not essential. Similarly, the ring 13ª is preferably formed with an internal surface 16ª corresponding to the cam surface 15 of ring 13, although here again this is not essential. The surfaces 16 and 16ª, however, shaped to correspond with the cam surfaces 15 and 15ª, permit a structure which is better balanced than could otherwise be easily attained. At the junctures of its internal surfaces 15 and 16 with each other, the ring 13 is provided with circumferentially facing shoulders 17 and 17ª which are opposed to the shoulders 10 and 10ª. The ring 13ª is provided with shoulders 17' and 17'' located at the junctures of its surfaces 15ª and 16ª.

The roller 12 is normally engaged with the shoulder 10 and with the shoulders 17 and 17', with the thin end of the cam 7ª and with the cam surface 15ª. The roller 12ª is normally engaged with the shoulders 10ª, 17ª and 17'', with the thin end 8 of the cam 7 and with the cam surface 15. With the parts so related, the clutch is free. As soon as the smallest fractional relative rotation of shaft 6 and rings 13, 13ª occurs however, the cam 7ª forces the roller 12 tightly against the cam surface 15ª of the ring 13ª, forcing this entire ring diametrically into tight frictional engagement with the wall 14. At the same time, cam 7 forces roller 12ª against the cam surface 15 of the ring 13, forcing this ring diametrically in the opposite direction into tight frictional engagement with the wall 14. To prevent roller 12 from contacting with the surface 16 of the ring 13 and to prevent roller 12ᵃ from contacting with the surface 16ᵃ of the ring 13ᵃ, said rings are provided with clearance spaces 18 and 18ᵃ respectively.

It will be seen from the foregoing that novel and advantageous provision has been made for carrying out the object of the invention. Rotation of the parts 6, 7, 7ᵃ, 12, 12ᵃ, 13 and 13ᵃ with respect to the wall 14 is freely allowed in one direction but is practically instantaneously prohibited in the other direction.

The circular wall 14 may be mounted in any desired way. It is shown carried by a web 19 having a bearing 20 through which shaft 6 passes, and for example, it may be considered that said wall 14 is suitably held against rotation and that the shaft 6 is rotatable with respect to said wall. The invention, however, is not restricted in this regard as will be obvious to those skilled in the art.

Any appropriate means may be provided for retaining the movable parts within the confines of the wall 14. For illustrative purposes, I have shown a cover plate 21 secured to the wall 14 by screws 22.

I claim:—

1. In a one-way clutch, a shaft, a circular wall concentric with said shaft, said wall and shaft being relatively rotatable, at least two rings encircling said shaft and disposed side by side between said wall and shaft, said rings being free of frictional engagement with said wall until forced diametrically in opposite directions, and two rollers at opposite sides of said shaft and disposed between said shaft and said rings, said shaft and rings being provided with oppositely pitched cams contacting with said rollers, said cams and rollers being operative to diametrically force said rings in said opposite directions into tight frictional engagement with said wall upon fractional relative rotation of said rings and shaft in one direction.

2. A structure as specified in claim 1; said shaft and rings having shoulders facing oppositely in circumferential directions and engaging opposite sides of said rollers when said rings are free of frictional engagement with said wall.

3. In a one-way clutch, a shaft having two circumferentially extending peripheral cams each of substantially 180° in length, each of said cams having a radially thin end and a radially thick end, said shaft having two circumferentially facing shoulders at the junctures of the ends of one cam with the ends of the other cam; two rollers engaging said cams and normally engaging said shoulders, at least two rings encircling said cams, and a circular wall encircling said rings and normally free of frictional engagement therewith, one of said rings being provided with an internal cam contacting with one of said rollers and following the peripheral contour of one of said cams of said shaft, the other of said rings being provided with an internal cam contacting with the other of said rollers and following the peripheral contour of the other of said cams of said shaft, said rings having circumferentially facing shoulders opposed to the aforesaid shoulders of said shaft and normally engaging said rollers respectively; said rollers and cams being operative, upon fractional relative rotation of said shaft and rings in one direction, to force said rings diametrically in opposite directions into tight frictional engagement with said wall.

WILLIAM A. JEX.